United States Patent

Kim et al.

[11] Patent Number: 5,446,738
[45] Date of Patent: Aug. 29, 1995

[54] ATM MULTIPLEXING SYSTEM

[75] Inventors: Kyeong S. Kim; Hyup J. Kim; Mun K. Choi, all of Daejeon, Rep. of Korea

[73] Assignee: Electronics and Telecommunications Research Institute, Daejeon, Rep. of Korea

[21] Appl. No.: 173,181

[22] Filed: Dec. 28, 1993

[30] Foreign Application Priority Data

Dec. 29, 1992 [KR] Rep. of Korea ............... 1992-26122

[51] Int. Cl.$^6$ .................................................. H04J 3/24
[52] U.S. Cl. ................................................ 370/94.2
[58] Field of Search ..................... 370/94.1, 60, 58.1, 370/58.2, 60.1, 85.6; 340/825.5, 825.51, 825.52

[56] References Cited

U.S. PATENT DOCUMENTS 4,947,388 8/1990 Kuwahara et al. .................. 370/60

FOREIGN PATENT DOCUMENTS 1-160130 6/1989 Japan .

OTHER PUBLICATIONS

H. Jonathan Chao, "Design of Transmission and Multiplexing System for Broadband Packet Network," IEEE Journal on Selected Area in Communications, vol. 6, No. 9, Dec., 1988.
Wen-Tsuen Chen et al., "A New ATM Multiplexer With Dynamic Scheduling," Proceedings of International Symposium On Communications, Dec. 1991, pp. 136-139.
R. Rocha et al., "A Distributed Merger for ATM," International Conference on Integrated Broadband Services & Networks, Oct. 1990, pp. 253-257.
T. Wu, et al., "Dynamic TDM: A Packet Approach To Broad Band Networking", International Conference On Communications, Jun., 1987, pp. 1585-1592.
S. H. Lee, "An Integrated Transport Technique For Circuit and Packet Switched Traffic", Proc. INFOCOM, 1988, pp. 110-118.

*Primary Examiner*—Douglas W. Olms
*Assistant Examiner*—Dang Ton
*Attorney, Agent, or Firm*—Spencer, Frank & Schneider

[57] ABSTRACT

An ATM multiplexing system comprising a plurality of ATM cell input circuits, each of which stores a cell stream incoming from a corresponding input stage and absorbs and removes instantaneous displacement of the incoming cells, a priority encoder for receiving simultaneously FIFO storage level information from the ATM cell input circuits and determining a priority for processing first an input stage with the largest number of stored cells, the FIFO storage level information including the number of the cells stored in the ATM cell input circuits, a link table processing circuit for receiving output headers from the priority encoder and input port numbers corresponding to the received headers and outputting changed headers corresponding to the received headers, an ATM cell output circuit for receiving the changed headers and link information from the link table processing circuit, determining a cell transmission order according to a service priority and performing a header assembling function for perfect cell production, a cell transmission controller for transmitting output headers from the ATM cell output circuit and the corresponding payloads and controlling the above-mentioned components, and a clock signal control circuit for generating a clock signal to control timing of the above-mentioned components.

6 Claims, 14 Drawing Sheets

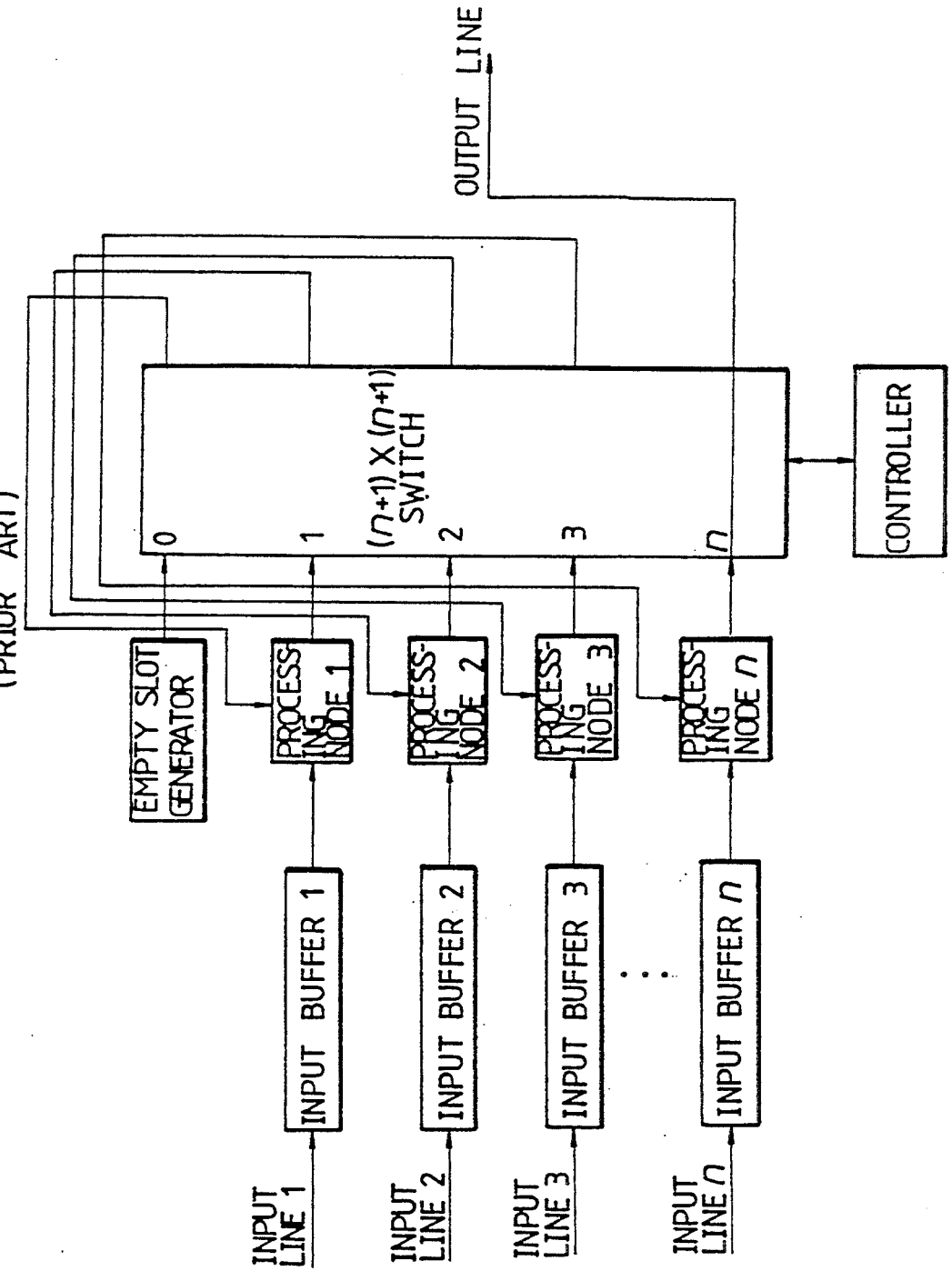

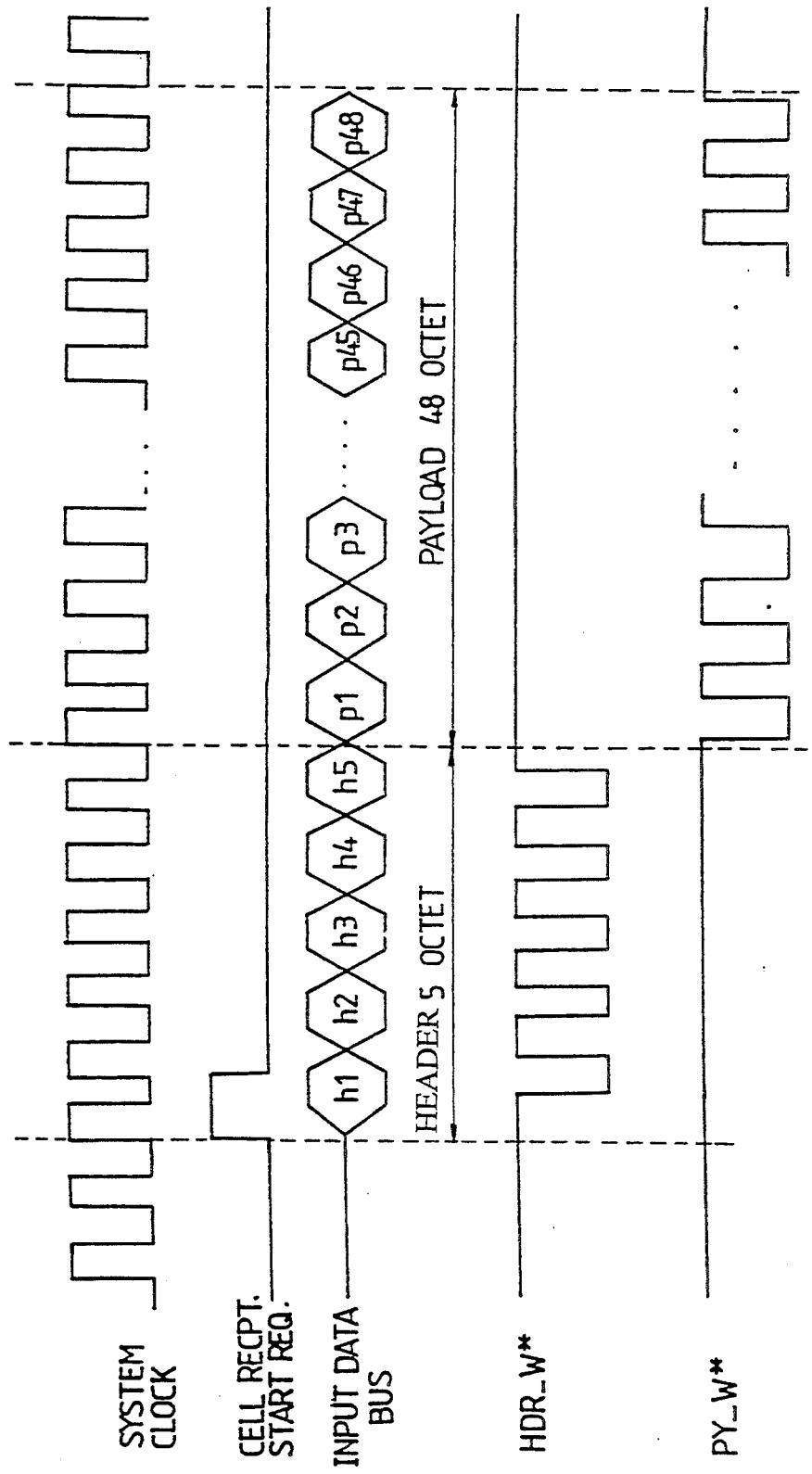

ATM MULTIPLEXING SYSTEM

BACKGROUND OF THE INVENTION

1. Field of the Invention

The present invention relates in general to an asynchronous transfer mode (referred to hereinafter as ATM) multiplexing system which can be commonly used in ATM network nodes, network termination units, terminal interface units and etc. as parts of a broadband integrated services digital network (referred to hereinafter as B-ISDN). More particularly, the present invention relates to an ATM statistical multiplexing system having a priority processing function and an ATM header changing function which are performed on the basis of buffer storage level information and link service priority information at input stages.

2. Description of the Prior Art

Various high quality services have been required by subscribers with the communication techniques already developed. According to such a trend, an ATM B-ISDN has been introduced to provide a consecutive service, such as a voice service, a high speed data service, such as a file transmission service and a burst-type service, such as a variable bit rate (referred to hereinafter as VBR) real time video service on the same transmission link. A multiplexing system suitable for such an environment is a kernel of a telecommunication system, and is used in a time division multiplexing (referred to hereinafter as TDM) circuit for an optical cable and in a cross pointer switch. Several methods have been proposed to implement such a multiplexing system. However, a proposed TDM system is suitable for an existing STM. For this reason, there is a necessity for implementing a flexible multiplexing system suitable for the future-oriented ATM B-ISDN.

An ATM statistical multiplexing system is a flexible network transfer technique which is capable of processing burst-type traffic as well as consecutive traffic. In particular, in view of data transmission, the ATM statistical multiplexing system has a flexible asynchronous multi-transmission function which is capable of processing a high speed data service in 150 Mbps class and a consecutive stream of data at a lower speed. In the STM network, a desired bandwidth on a trunk can be obtained by mathematically summing all fixed bit rates. But, the ATM network is increased in efficiency by a statistical multiplexing effect on sources under the condition that the sources are sufficiently multiplexed and are of no relevance to one another.

A broadband terminal adapter is required to multiplex various service links into a single cell stream based on a link service priority. Also, in a broadband network termination unit (B-NT2), a user network interface (referred to hereinafter as UNI) is required to concentration-multiplex cells sent from a plurality of subscriber transmission lines into a single consecutive cell stream to satisfy characteristics of services belonging to the cells. These ATM multiplexing functions are important parts for the implementation of the B-ISDN. The ATM multiplexing system must reflect a network-in-flexibility for the purpose of an increase in application to various services and of the optimum use of available resources. Also, the ATM multiplexing system must accommodate services and the associated terminals independent of a network clock for the purpose of coupling a plurality of sources in the ATM network on a single transmission link. These characteristics result in cell loss and cell delay displacement in the ATM multiplexing.

For this reason, the ATM multiplexing system must have input stages with such a construction as to accommodate various services independent of a network clock. Also, the ATM multiplexing system must perform a flexible cell process based on a priority of various service links. Basically, a plurality of inputs must be routed to a single output with no cell conflict and, at the same time, a changed header must be transferred. To this end, the fastest device technique must be used to implement such an ATM multiplexing system.

Referring to FIG. 1A, there is shown a block diagram of a conventional ATM multiplexing system. Basically, the conventional ATM multiplexing system comprises a plurality of input buffers, each of which stores input data from a corresponding one of a plurality of input lines, and a scheduler for routing a plurality of output data from the input buffers on a single link. In this ATM multiplexing system, a proper scheduling algorithm is required to avoid a cell conflict. Also, the conventional ATM multiplexing system is complex in design and has trade-off between functions thereof.

Referring to FIG. 1B, there is shown a block diagram of another conventional ATM multiplexing system. As shown in this drawing, the conventional ATM multiplexing system. As shown in this drawing, the conventional ATM multiplexing system employs a train scheduling manner including the most basic scheduler. Each of a plurality of input buffers stores input data from a corresponding one of a plurality of input lines. An empty slot generator is provided to generate an empty slot (i.e., idle cell) at a fixed speed. The empty slot from the empty slot generator enters the processing nodes sequentially, being transferred through adjacent processing nodes. Upon the presence of a cell from one of the input buffers to be transmitted, the cell is transmitted by being placed in the empty slot. In this case, a cell transmission priority is always present in the processing node nearest to the empty slot generator, resulting in prevention of a cell conflict. However, the priority of the processing nodes is fixed and the cell transmission opportunity does not frequently occur in the processing node positioned away from the empty slot generator. This results in a cell loss and a shortage of fairness.

Referring to FIG. 1C, there is shown a block diagram of another conventional ATM multiplexing system. This ATM multiplexing system is proposed by Chao (Bellcore, U.S.A.). In order to make up for fixed priority, the Chao multiplexing system comprises a $(n+1) \times (n+1)$ switch matrix provided at the output stages of an empty slot generator and the processing nodes of FIG. 1B, in addition to the construction of FIG. 1B. The switch is selectively connected to change the priority. However, the Chao multiplexing system does not propose a scheduling technique for reducing a cell lost rate.

Referring to FIG. 1D, there is shown a block diagram of another conventional ATM multiplexing system. This ATM multiplexing system is a dynamic ATM multiplexing system proposed by Chen (the Nationalist China). Here, the cell loss rate is reduced by reducing overflow conditions of the input buffers by applying the principle of full-buffer-first-service to the Chao system. In the case where the input buffers are full, the data transmission is performed at the next cell transmission time, so that the overflow of the buffers cannot instantaneously take place. Each of the processing nodes detects the full state of the corresponding input buffer and sends a self-node identifier to a controller upon detection of the full state. Upon receiving the self-node identifiers from the processing nodes, the controller controls the switch to connect the output of the empty slot generator to the processing node with a smallest one of the self-node identifiers.

In the above-mentioned Chao ATM multiplexing system, an input stage at a higher position has a higher priority since the processing nodes are implemented in a daisy-chain manner. Hence, the input stage at the higher position must be assigned for a better service. In this manner, the Chao ATM multiplexing system is available at a subscriber state in performing cell assembling according to a desired service and then performing cell multiplexing, but not available for the cell multiplexing in a remote node or a network termination unit. Also, int he case where burst-type traffic is applied to the input stage of a higher priority, cell loss takes place at the input state of a lower priority. This results in a shortage of fairness of the cell transmission. Also, a faulty operation of only one node results in a malfunction of the whole system. To solve this problem, the switch must be controlled to separate a processing node with a fault from others.

In the above-mentioned dynamic ATM multiplexing system, the controller sends a "reconfiguration" signal to the empty slot generator upon the change of the switch connection. At this time, the generated cell (slot) of the empty slot generator must indicate a data full state so that the cells from the processing node are prevented from being transmitted upon the change of the switch connection. For this reason, a channel capacity for the cell transmission is wasted for that period. Also, the connection reconfiguration must not be performed in the middle of a cell transmission from the processing node so that a valid cell is not subjected to a damage. On the other hand, an idle cell must continuously be transmitted for a cell synchronization when cell transmission is not performed. In this case, the cell synchronization may be lost because the transmission of the idle cell is not performed during the changing of the switch connection. Because a cross-point switch has a complex circuitry construction, there must be present at every node a function of converting the transmission cells from the input buffer into a bit stream for parallel data transmission in the unit of a byte. This results in waste of the circuitry and requires a very high switching speed.

Referring to FIG. 1E, there is shown a block diagram of another conventional ATM multiplexing system. This ATM multiplexing system is proposed by Karo (Fujitsu, Japan). The Karo ATM multiplexing system has a construction different from those mentioned above. As shown in this drawing, the cells transmitted from the plurality of subscriber lines are stored in the corresponding input buffers. A plurality of multiplexing switches are provided to concentration-multiplex the cells from the input buffers on a single transmission line. Each of a plurality of multiplexing controllers is provided to control a corresponding one of the multiplexing switches. The cells from the input buffers are concentration-multiplexed according to states of the multiplexing controllers.

A flag signal line is used to couple the multiplexing controllers in a ring-shaped structure. A flag signal FLG indicates a channel use and a multiplexed state of each input stage. The flag signal FLG is circulated along the flag signal line to assign an authority to the transmission of the cells stored in the input buffers. As seen from FIG. 1E, the multiplexing controllers are distributed, instead of using the switch in the above-mentioned basic construction, in a manner proper to the ring-shaped structure based on a topology of the subscribers.

Referring to FIG. 1F, there is shown a block diagram of another conventional ATM multiplexing system. This ATM multiplexing system is proposed by Rocha (Portugal). As shown in this drawing, the Rocha ATM multiplexing system comprises multiplexing parts, input/output data buses and a bus use arbitration bus. Each of the multiplexing parts includes an input buffer, a bus control circuit, a bus use conflict arbitration circuit and a transmission controller. For the purpose of performing a scheduling function for the multiplexing, a processor sequentially reads priority vectors through the bus use arbitration bus and uses the output data bus according to the determined priority to enable data transmission. The priority vectors have determination variables which are generated for the control of bus access by the bus use conflict arbitration circuit.

Therefore, the processor must have excellent function and speed to implement the ATM multiplexing system capable of transmitting the cells at a high speed. Also, the processor is complex in construction and is not suitable for a service with burst-type traffic, in that it checks the states of the input buffers in the daisy-chain manner using the single bus use arbitration bus. Further, in each multiplexing part, there is present a structure for generating an idle cell or an unassigned cell. At least one of the multiplexing parts must be present at an active state to generate the unassigned cell. Moreover, each multiplexing part must have a header change function. As a result, the circuitry is complex, and it is difficult to manage a link table.

SUMMARY OF THE INVENTION

Therefore, the present invention has been made in view of the above problems, and it is an object of the present invention to provide an ATM multiplexing system having priority processing and header changing functions, in which the multiplexing is performed with a low cell loss rate with respect to a burst-type video service, as well as a CBR telephone service.

In accordance with the present invention, the above and other objects can be accomplished by a provision of an ATM multiplexing system having priority processing and header changing functions, comprising a plurality of ATM cell input means, each of the ATM cell input means storing a cell stream incoming from a corresponding input stage and absorbing, or receiving, and removing instantaneous displacement of the incoming cells; priority encoding means for receiving simultaneously FIFO storage level information from the plurality of ATM cell input means and determining a priority for processing first an input stage with the largest number of stored cells, the FIFO storage level information including the number of the cells stored in the ATM cell input means; link table processing means for receiving output headers from the priority encoding means and input port numbers corresponding to the received headers and outputting changed headers corresponding to the received headers; ATM cell output means for receiving the changed headers and link information from the link table processing means, determining a cell transmission order according to a service priority and performing a header assembling function for perfect, or accurate cell production; cell transmission control means for transmitting output headers from the ATM cell output means and the corresponding payloads and controlling the ATM cell input means, the priority encoding means, the link table processing means and the ATM cell output means; and clock signal control means for generating a clock signal to control timing of the ATM cell input means, the priority encoding means, the link table processing means, the ATM cell output means and the cell transmission control means.

BRIEF DESCRIPTION OF THE DRAWINGS

The above and other objects, features and advantages of the present invention will be more clearly understood from the following detailed description taken in conjunction with the accompanying drawings, in which:

FIGS. 1A to 1F are block diagrams of conventional ATM multiplexing systems;

FIG. 3B is a timing diagram of signals in the ATM cell input circuit in FIG. 3A;

DETAILED DESCRIPTION OF THE PREFERRED EMBODIMENT

Figure 1A:
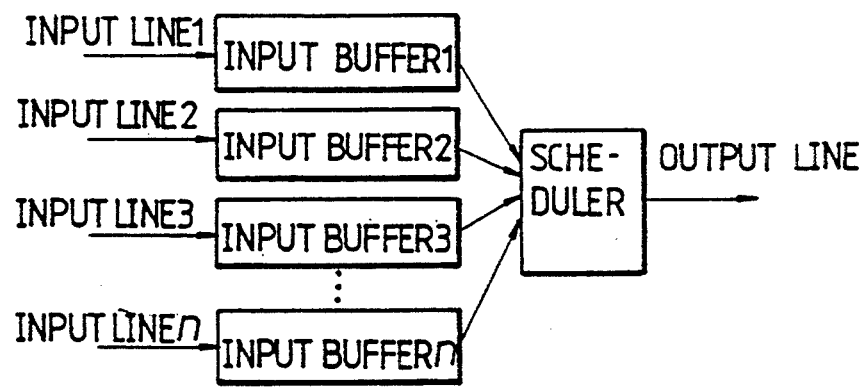
Figure 1B:
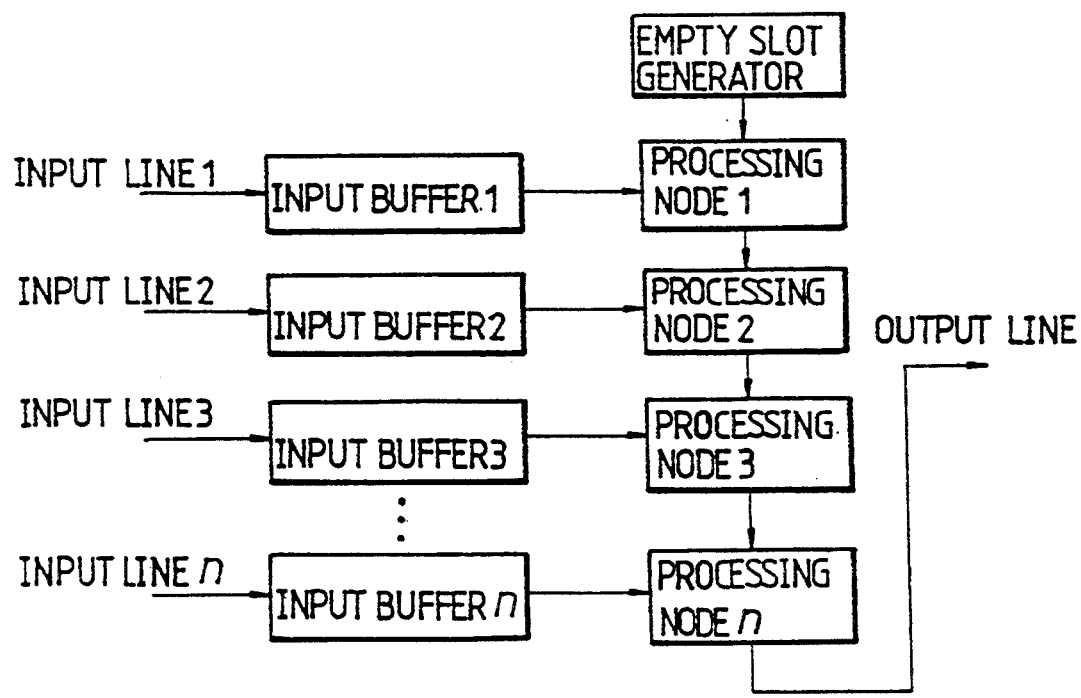
Figure 1D:
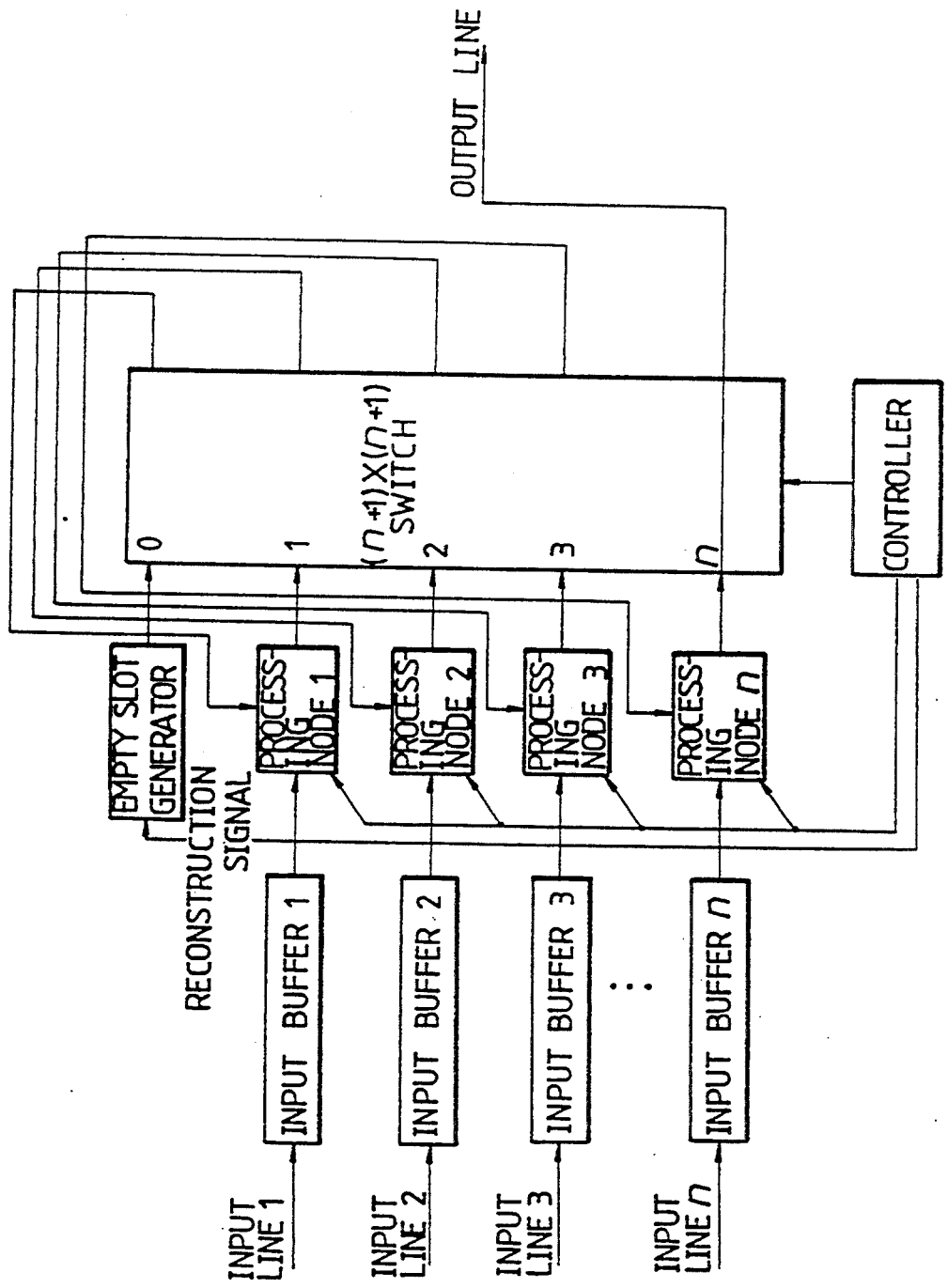
Figure 1E:
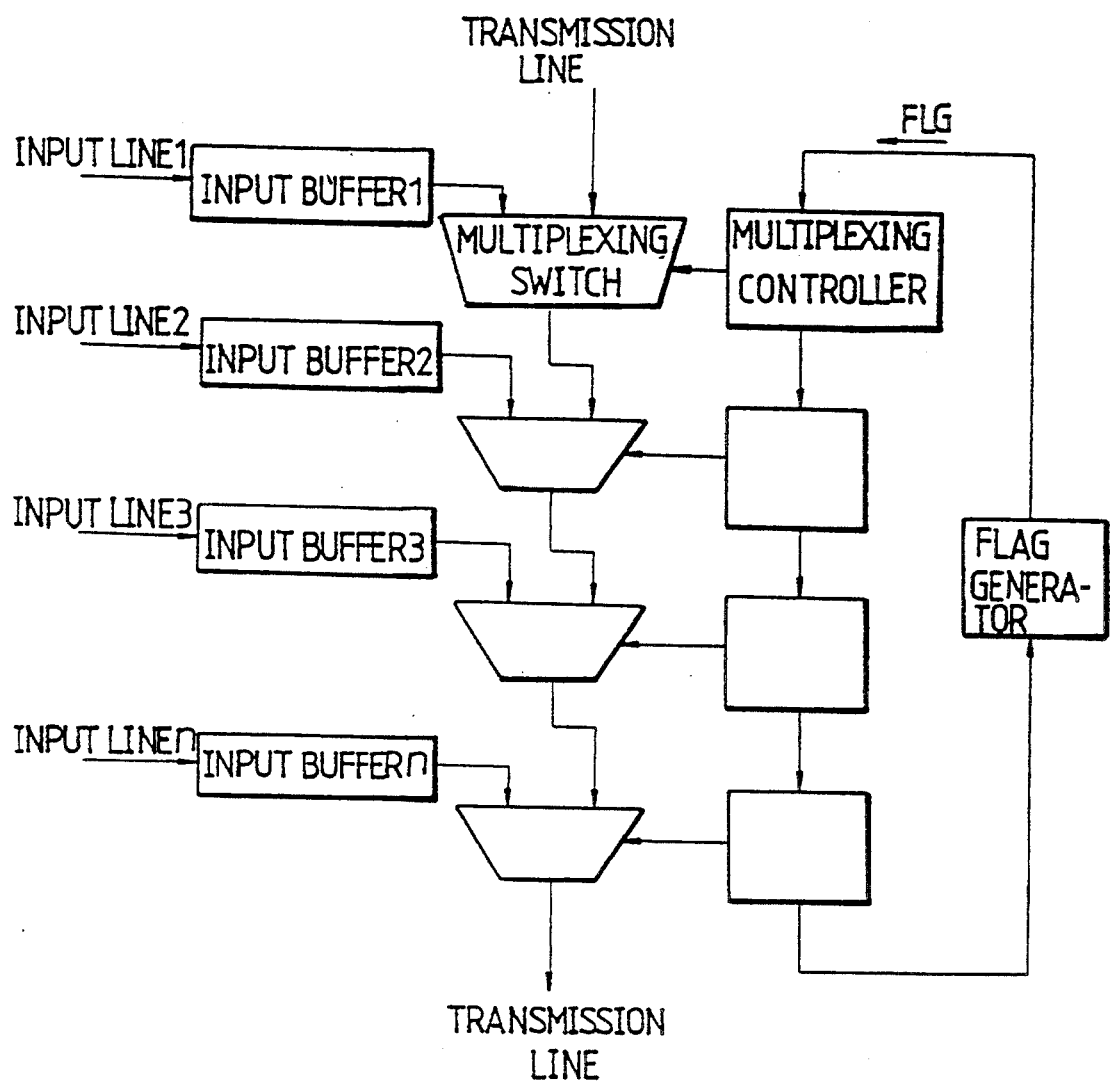
Figure 1F:
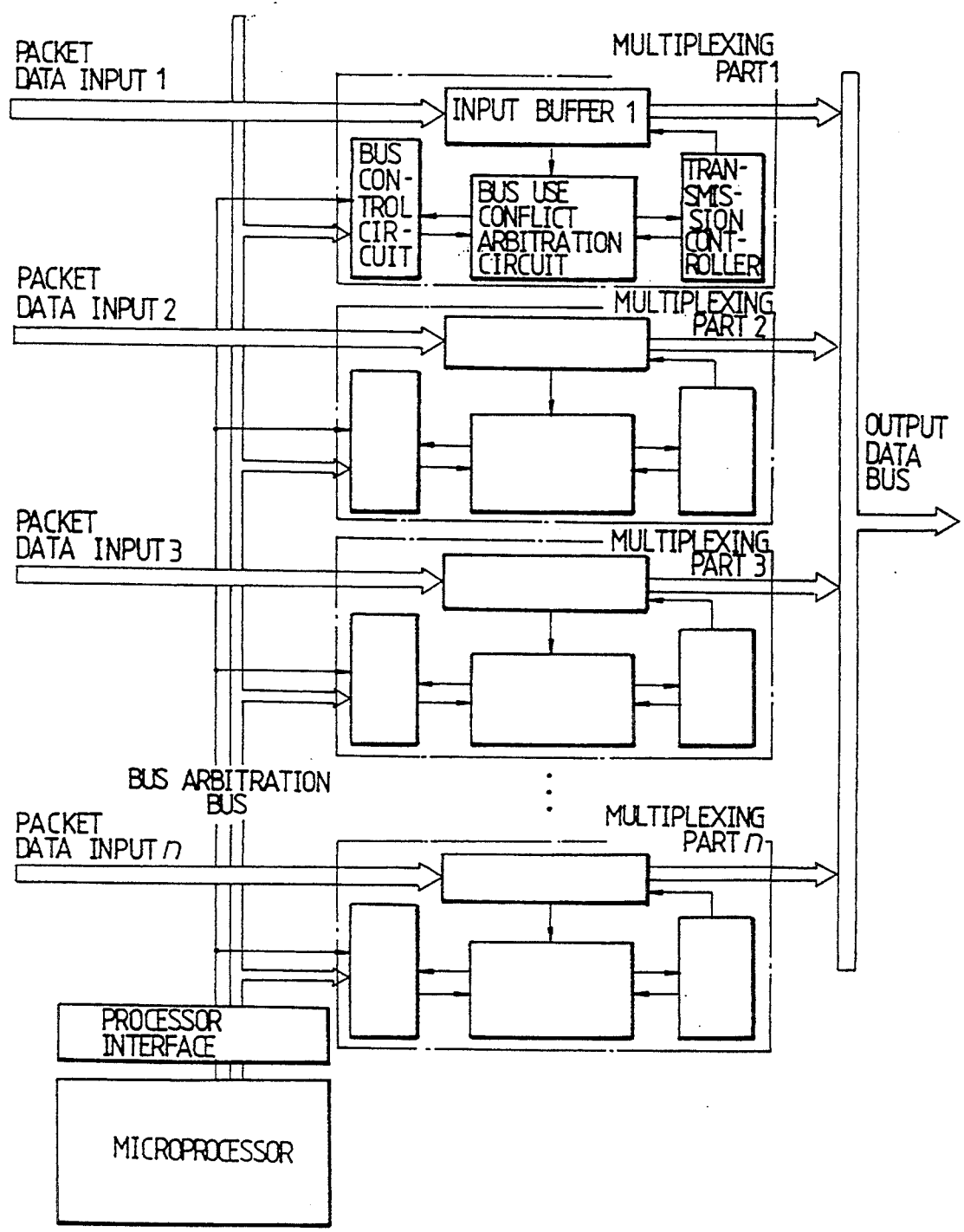
Figure 2:
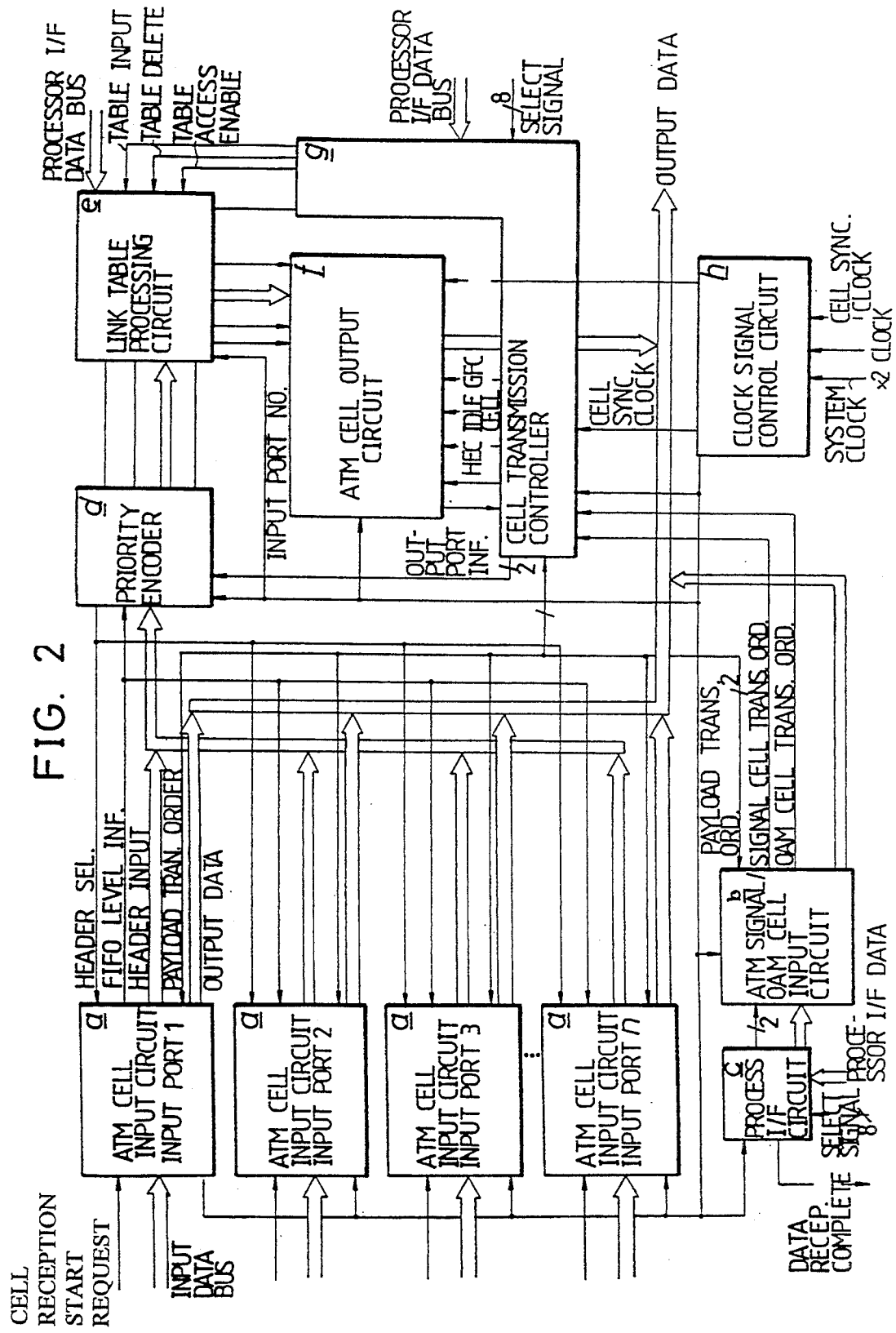
FIG. 2 is a block diagram of an ATM multiplexing system in accordance with the present invention.

Referring to FIG. 2, there is shown a block diagram of an ATM multiplexing system in accordance with the present invention. As shown in this drawing, the ATM multiplexing system comprises a plurality of ATM cell input circuits a. Each of the ATM cell input circuits a detects a cell synchronization from a cell stream incoming from a corresponding input stage (input data bus). In response to a cell reception start request signal, each ATM cell input circuit separates a header and a payload from the cell stream and generates FIFO storage level information.

A priority encoder d is provided in the ATM multiplexing system to receive the headers and the FIFO storage level information from the ATM cell input circuits. The priority encoder d reads the 5 bytes of the received headers and sends the resultant header changing and link service priority information to a link table processing circuit e. The priority encoder d is operated for first processing an input stage with the largest number of stored cells to reduce a traffic load.

The link table processing circuit e is adapted to receive output headers from the priority encoder d and input port numbers corresponding to the received headers. Then, the link table processing circuit e sends changed headers corresponding to the received headers and ATM link service priority information to an ATM cell output circuit f. Also, the link table processing circuit e performs an interfacing operation with a processor to apply new link identifier information VPI and VCI to a desired link table upon setting an ATM hierarchical link or to delete the existing information upon releasing the existing link.

The ATM cell output circuit f is adapted to receive the changed headers from the link table processing circuit e and the corresponding input port numbers. The ATM cell output circuit f determines a cell transmission order according to link information regarding n headers. Then, the ATM cell output circuit f designates a payload output port for the cell transmission based on the determined order. Also, the ATM cell output circuit f performs header transmission corresponding to the payload to be transmitted, before the payload transmission.

A cell transmission controller g is also provided in the ATM multiplexing system to control the ATM cell input circuits a, the priority encoder d, the link table processing circuit e and the ATM cell output circuit f and control the cell transmission.

A clock signal control circuit h is also provided in the ATM multiplexing system to generate a system clock and a cell synchronous clock to control timing of the ATM cell input circuits a, the priority encoder d, the link table processing circuit e, the ATM cell output circuit f and the cell transmission controller g.

An ATM signal/OAM cell input circuit b is also provided in the ATM multiplexing system to store payloads of OAM and signal cells to perform a system maintenance function in the same manner as the multiplexing of the cells transferred from the input stages.

A processor interface circuit c is also provided in the ATM multiplexing system to transfer the OAM and signal cells from the processor to the ATM signal/OAM input circuit b.

Figure 3A:
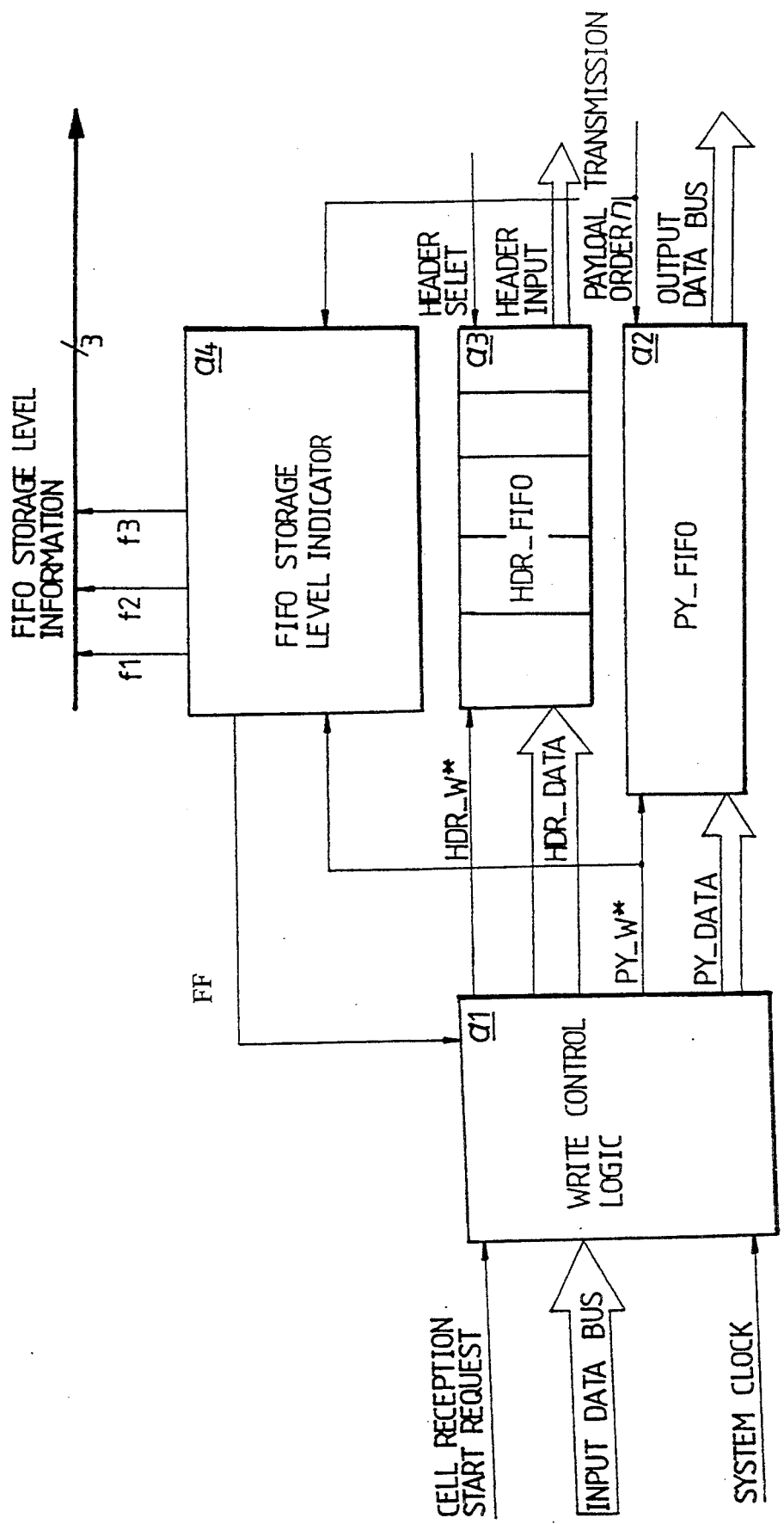
FIG. 3A is a detailed block diagram of an ATM cell input circuit in FIG. 2.

Referring to FIG. 3A, there is shown a detailed block diagram of each of the ATM cell input circuits a. Each ATM cell input circuit a functions to store the cell stream incoming from the corresponding input stage and absorb, or receive, and remove instantaneous displacement of the incoming cells.

As shown in FIG. 3A, each ATM cell input circuit a includes a write control logic a1 for detecting a byte clock and the cell synchronization from the cell stream incoming from the corresponding input stage, checking the presence of an error in the cell header and generating payload data, header data, a header write signal and a payload write signal.

A header FIFO buffer a3 is provided in the ATM cell input circuit a to receive the header data from the write control logic a1 through a header data bus HDR-DATA and store the received header data in the unit of byte in response to the header write signal HDR-W* from the write control logic a1.

A payload FIFO buffer a2 is also provided in the ATM cell input circuit a to receive the payload data from the write control logic a1 through a payload data bus PY-DATA and store the received payload data in the unit of 48 bytes in response to the payload write signal PY-W* from the write control logic a1.

A FIFO storage level indicator a4 is also provided in the ATM cell input circuit a to count the number of the cells stored in the payload FIFO buffer a2 in response to the payload write signal PY-W* from the write control logic a1 and output the resultant FIFO storage level information.

Also, the FIFO storage level indicator a4 outputs a signal FF indicative of the full state of the payload FIFO buffer a2. In response to the signal FF from the FIFO storage level indicator a4, the write control logic a1 stops the writing operation for the payload FIFO buffer a2 to prevent a loss of the cell synchronization.

Defining the full state FF of the payload FIFO buffer a2 as K cells, which are quantized into three bits f1, f2 and f3, the FIFO storage level indicator a4 can indicate the storage level as in the following table 1:

TABLE 1

| the number of stored cells | f1 | f2 | f3 |
|---|---|---|---|
| - K (full) | 1 | 1 | 1 |
| - 6K / 7 (ALFF) | 1 | 1 | 0 |
| - 5K / 7 | 1 | 0 | 1 |
| - 4K / 7 | 1 | 0 | 0 |
| - 3K / 7 | 0 | 1 | 1 |
| - 2K / 7 | 0 | 1 | 0 |
| - K / 7 (ALEF) | 0 | 0 | 1 |
| - 0 (empty) | 0 | 0 | 0 | where, ALFF means almost full state of the payload FIFO buffer a2 and ALEF means almost empty state of the payload FIFO buffer a2.

The FIFO storage level indicator a4 sends the FIFO storage level information to the priority encoder d at the appointed time. The priority encoder d determines the cell transmission upon receiving the FIFO storage level information from the FIFO storage level indicator a4. Then, the priority encoder d performs the cell transmission in response to a header select signal and a payload transmission instruct signal based on cell transmission timing. FIG. 3B is a timing diagram of the signals in the ATM cell input circuit a.

Figure 4:
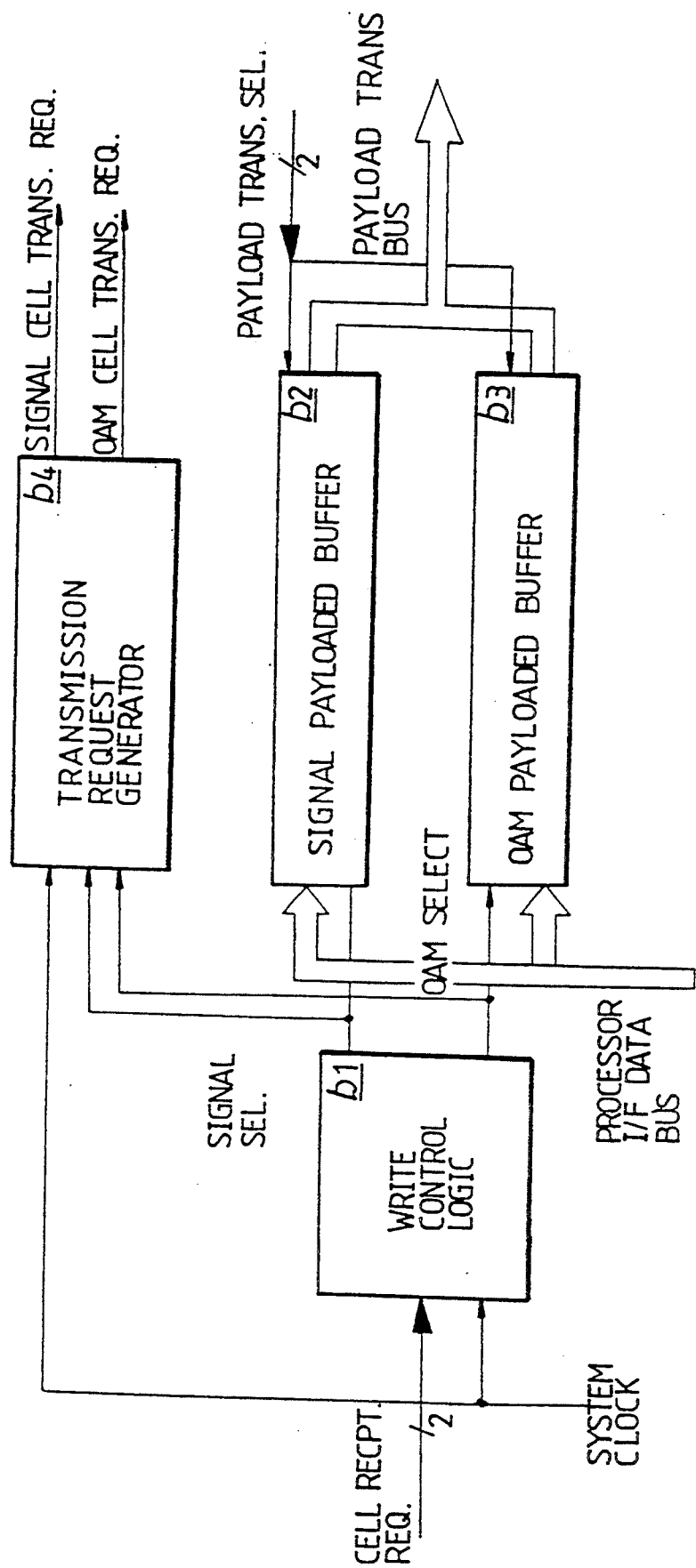
FIG. 4 is a detailed block diagram of an ATM signal/OAM cell input circuit in FIG. 2.

Referring to FIG. 4, there is shown a detailed block diagram of the ATM signal/OAM cell input circuit b. The ATM signal/OAM cell input circuit b is adapted to store payloads of the OAM cell and the signal cell to perform the system maintenance function (OAM), in the same manner as that in the ATM cell input circuit a storing temporarily the cells transferred from the input stage. The OAM cell and the signal cell are sent from the processor.

A write control logic b1 is operated in a similar manner to that of the write control logic a1 in the ATM cell input circuit a. In response to a cell reception request signal from the processor interface circuit e, the write control logic b1 stores the payloads of the signal and OAM cells into signal and OAM payload FIFO buffers b2 and b3. Also, the write control logic b1 sends a payload select signal to a transmission request generator b4.

Upon receiving the payload select signal from the write control logic b1, the transmission request generator b4 generates system OAM cell and signal cell transmission request signals to the cell transmission controller g. Then, upon receiving a payload transmission select signal based on determination of the cell transmission, the signal and OAM payload FIFO buffers b2 and b3 send their payloads over an output data bus.

Figure 5:
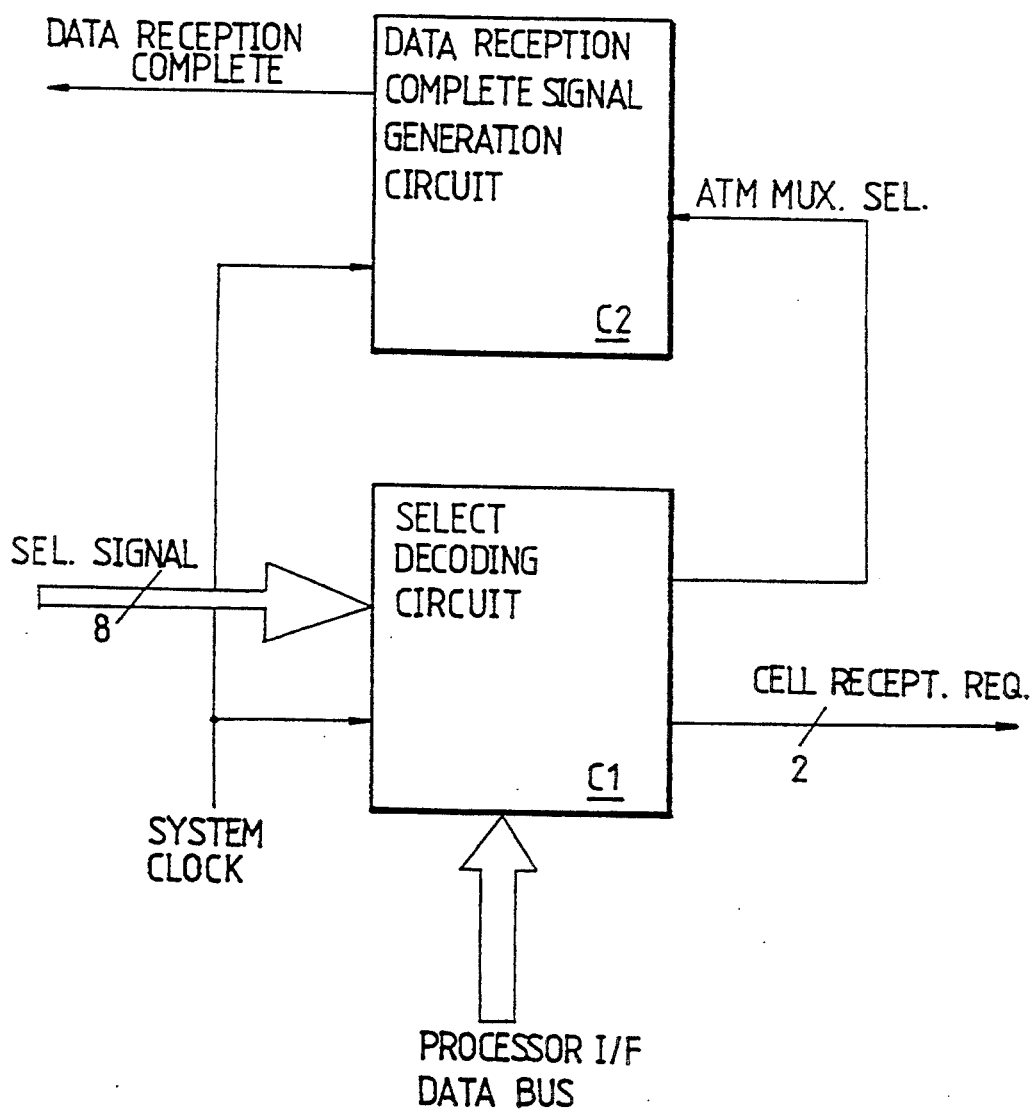
FIG. 5 is a detailed block diagram of a processor interface circuit in FIG. 2.

Referring to FIG. 5, there is shown a detailed block diagram of the processor interface circuit c. The processor interface circuit c is adapted to transfer the OAM and signal cells from the processor to the ATM signal/OAM cell input circuit b according to a requirement of the processor for the system management. As shown in this drawing, the processor interface circuit c includes a select decoding circuit c1 for receiving a select signal from the processor and generating the cell reception request signal and an ATM multiplexer select signal, and a data reception complete signal generation circuit c2 for receiving the ATM multiplexer select signal and generating a data reception complete signal indicative of the reception of the transmission data.

Figure 6A:
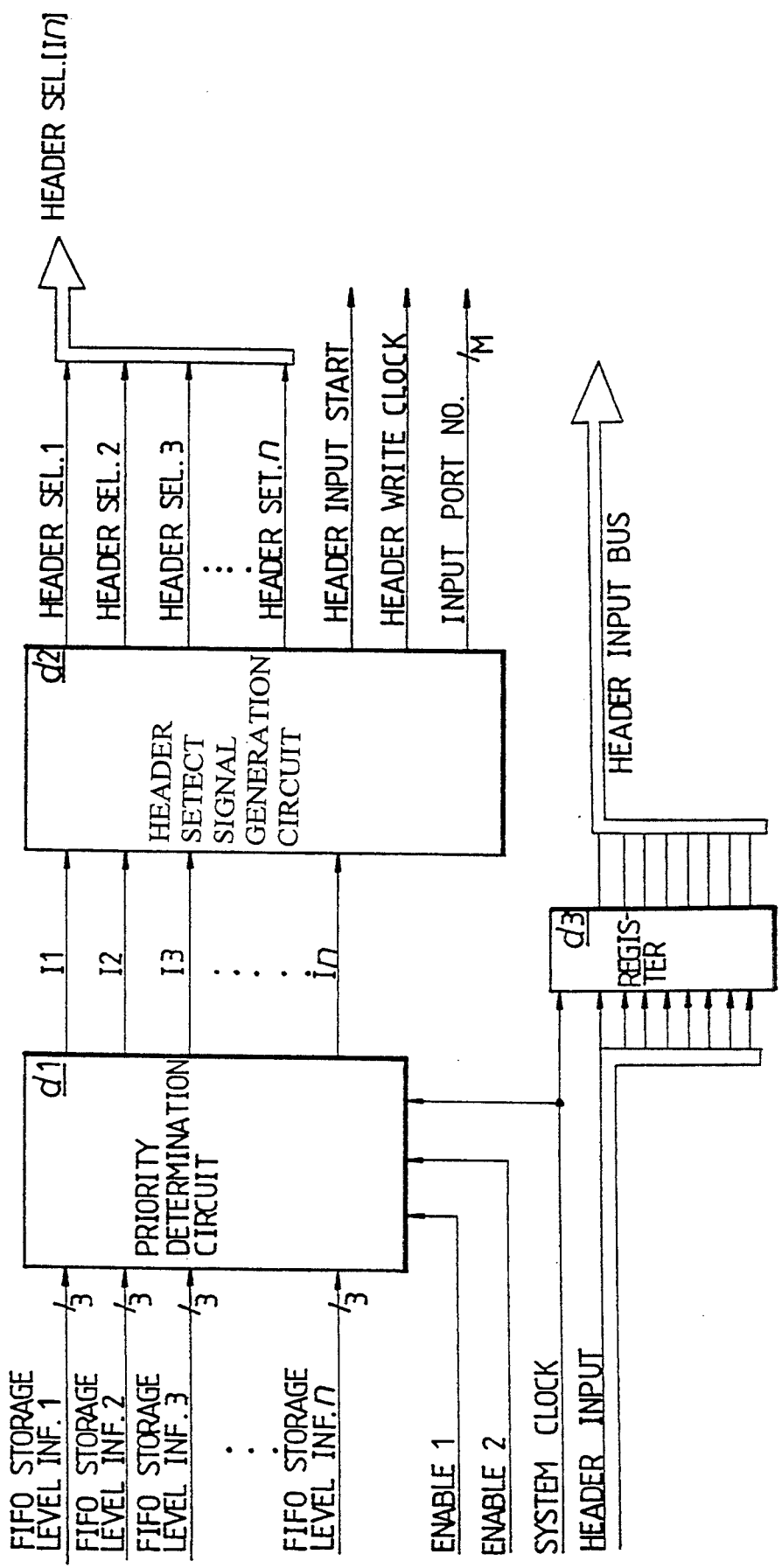
FIG. 6A is a detailed block diagram of a priority encoder in FIG. 2.

Referring to FIG. 6A, there is shown a detailed block diagram of the priority encoder d. As shown in this drawing, the priority encoder d includes a priority determination circuit d1 for controlling the first reading of the cells from the input stage with the largest number of stored cells in response to the FIFO storage level information from the ATM cell input circuits a.

A header select signal generation circuit d2 is provided in the priority encoder d to generate header select signals to read the headers from the ATM cell input circuits a according to an order determined by the priority determination circuit d1 and to generate a header input start signal, a header write clock signal and the input port number to apply the read headers to the link table processing circuit e.

A register d3 is also provided in the priority encoder d to control timing of the read headers in response to the output signals from the header select signal generation circuit d2.

The operation of the priority determination circuit d1 is classified by first and second priority determination enable signals. First, in the case where the first priority determination enable signal is asserted, the priority determination circuit d1 takes fixed values with respect to the received FIFO storage level information with state variations and classifies the input ports in the order of their values to determine the priority. Second, if the second priority determination enable signal is asserted, the priority determination circuit d1 adds a port number of an input stage with a high FIFO storage level upon the presence of no transmission cell in n input ports. This has the effect of increasing a concentration efficiency of a transmission channel.

Figure 6B:
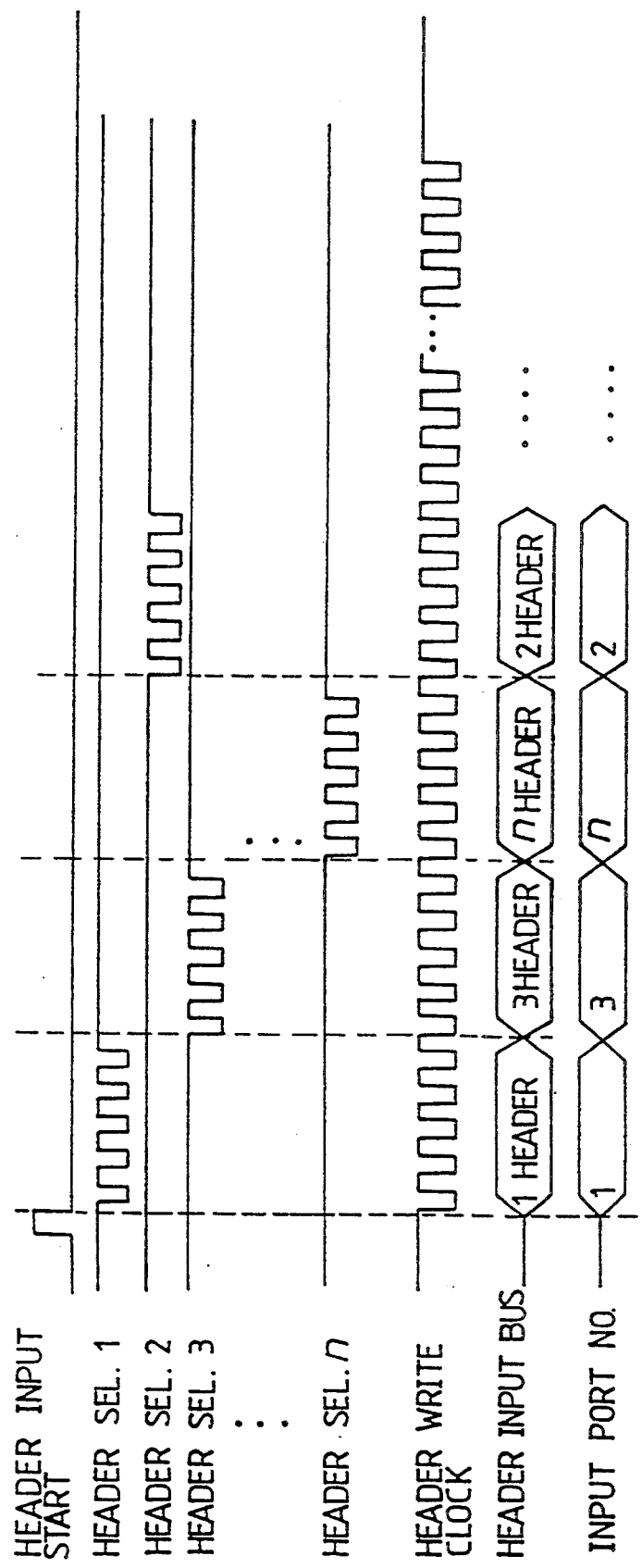
FIG. 6B is a timing diagram of signals in the priority encoder in FIG. 6A.

In this connection, the processing speed of the priority determination circuit d1 must be much higher than that of the incoming cell stream to prevent a delay in the cell transmission. For this reason, a fast digital logic is required to implement the priority determination circuit d1. FIG. 6B is a timing diagram of the signals in the priority encoder d. From table 2 below, it can be seen that the cells from the input ports 3 and 2 with the high FIFO storage levels are additionally transmitted because of the presence of no transmission cell in the input ports 4 and 5.

TABLE 2

| n = 8 (priority determination enable signal 1 = H) | | | | |
|---|---|---|---|---|
| input port number | f1 | f2 | f3 | |
| 1 | 1 | 0 | 0 | 4 |
| 2 | 1 | 1 | 0 | 6 |
| 3 | 1 | 1 | 1 | 7 |
| 4 | 0 | 0 | 0 | 0 |
| 5 | 0 | 0 | 0 | 0 |
| 6 | 0 | 0 | 1 | 1 |
| 7 | 0 | 0 | 1 | 1 |
| 8 | 0 | 1 | 1 | 3 |

| (priority determination enable signal 2 = H) | |
|---|---|
| priority | input port |
| 1 | 3 |
| 2 | 2 |
| 3 | 1 |

-continued

| (priority determination enable signal 2 = H) | |
|---|---|
| priority | input port |
| 4 | 8 |
| 5 | 6 |
| 6 | 7 |
| 7 | 3 |
| 8 | 2 |

Figure 7:
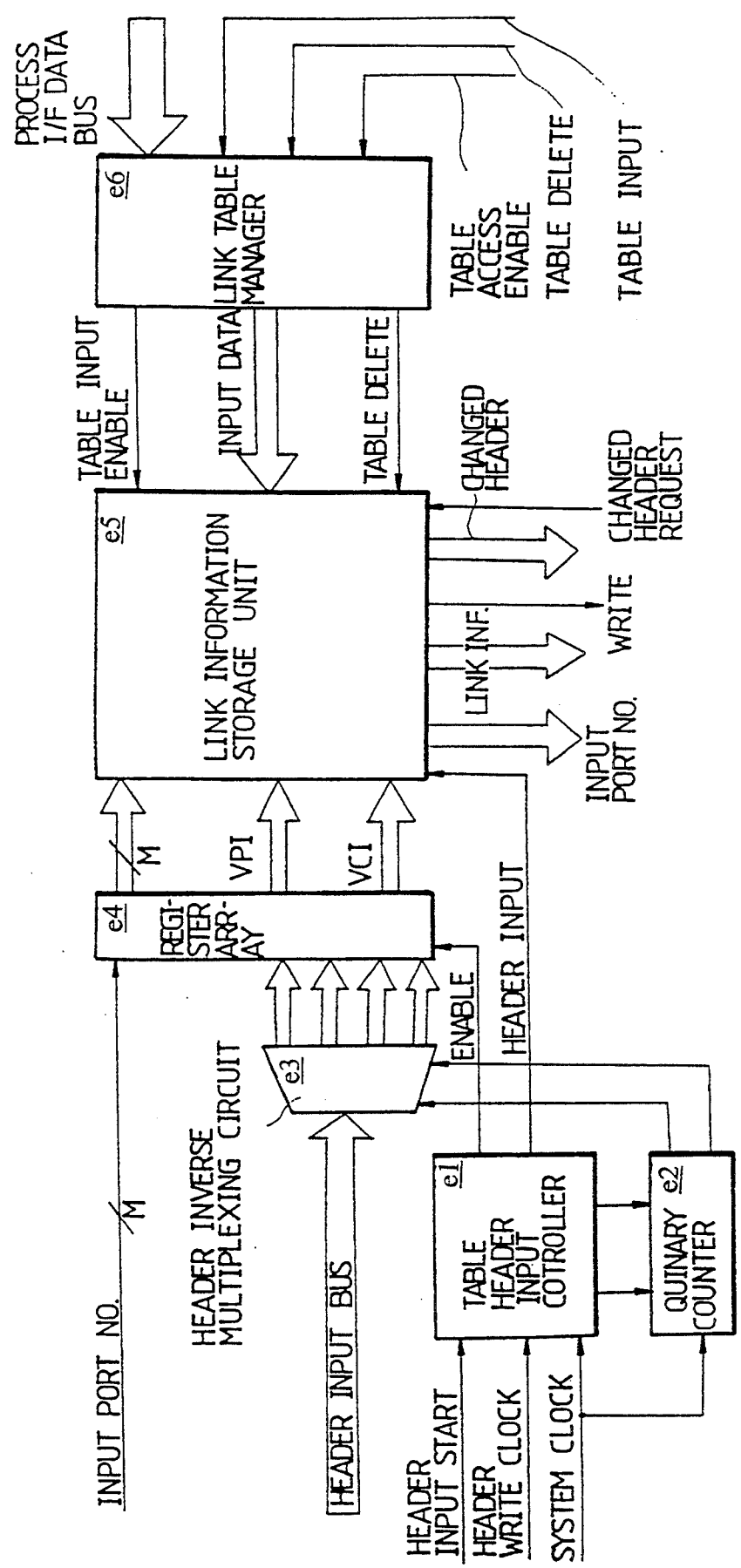
FIG. 7 is a detailed block diagram of a link table processing circuit in FIG. 2.

Referring to FIG. 7, there is shown a detailed block diagram of the link table processing circuit e. The link table processing circuit e is adapted to receive the input port number and other control signals and the read heads from the header FIFO buffers a3 in the ATM cell input circuits a according to the order determined by the priority encoder d. Then, the link table processing circuit e arranges the received heads in parallel and applies the arranged headers to the link table. Then, the link table processing circuit e changes the headers in response to the changed link identifier information VPI and VCI. In this case, the changed headers are transmitted with the link identifier information VP1 and VCI changed suitably for the corresponding links.

As shown in FIG. 7, the link table processing circuit e includes a header inverse multiplexing circuit e3 for receiving the headers from the priority encoder d through a header bus and processing the received headers in parallel, a quinary counter e2 for controlling the parallel header process of the header inverse multiplexing circuit e3, a table header input controller e1 for controlling a counting operation of the quinary counter e2 in response to the header input start signal and the header write clock signal from the priority encoder d, and a register array e4 for controlling timing of the parallel headers from the header inverse multiplexing circuit e3.

A link information storage unit (link table) e5 is provided in the link table processing circuit e to transfer the link identifier information VP1 AND PC1 from the register array e4, the link identifier information VP1 and VC1 changed with respect to the corresponding input port number and the link service priority information to the ATM cell output circuit f.

A link table manager e6 is also provided in the link table processing circuit e to apply new link identifier information VP1 and VC1 to the link table upon setting a new link or delete the existing information upon releasing the existing link.

The link table manager e6 receives a link table access enable signal, a table input signal and a table delete signal from the cell transmission controller g. Also, the link table manager e6 receives the VP1/VC1 information regarding the corresponding link, the changed VP1/VC1 information and the link information through the data bus of the processor interface circuit. On the basis of the received information and signals, the link table manager e6 generates a table input enable signal to manage the input of a new link to the table.

Figure 8:
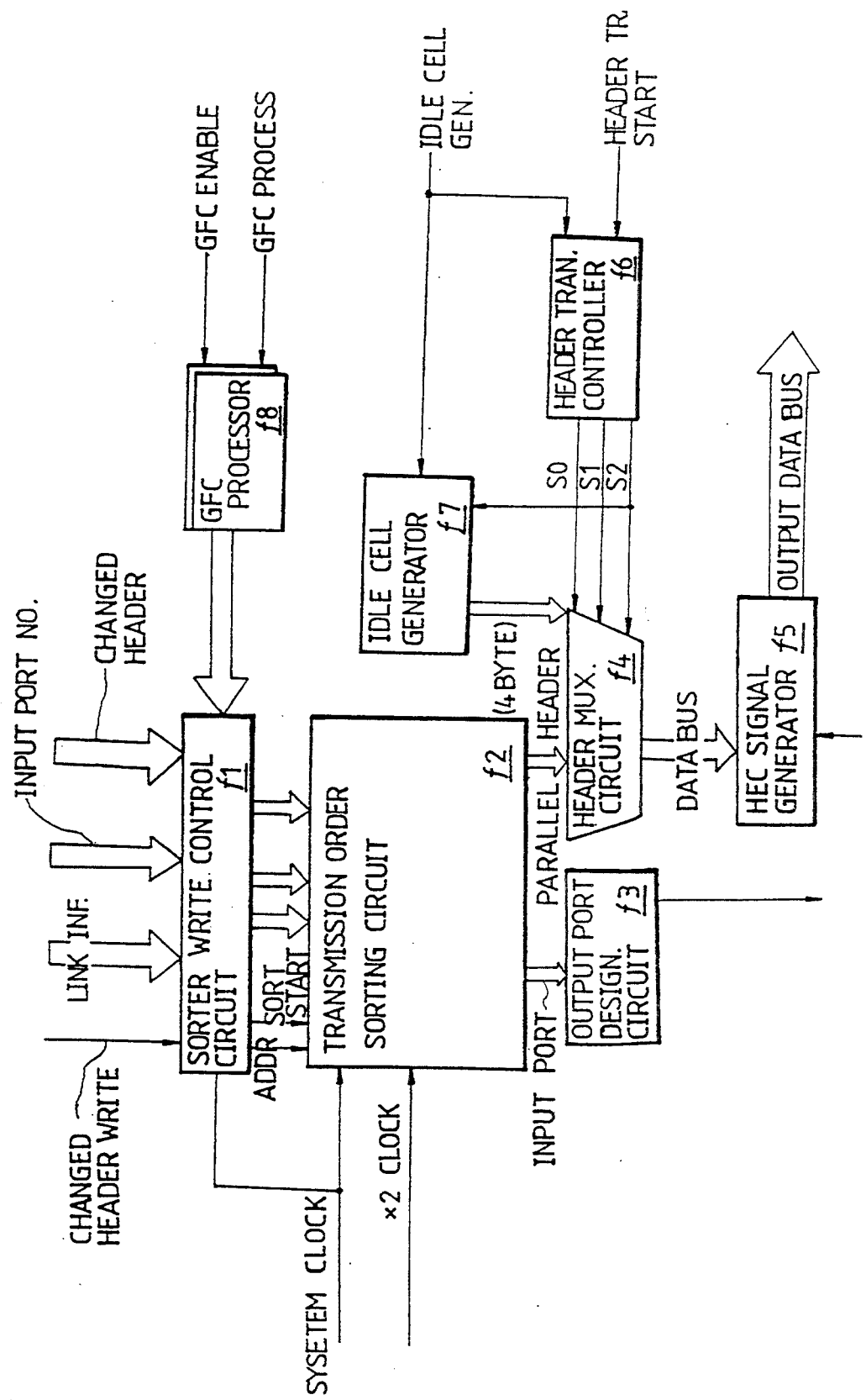
FIG. 8 is a detailed block diagram of an ATM cell output circuit in FIG. 2.

Referring to FIG. 8, there is shown a detailed block diagram of the ATM cell output circuit f. As shown in this drawing, the ATM cell output circuit f. As shown in this drawing, the ATM cell output circuit f includes a sorter write control circuit f1 for generating an address signal and a sorting start signal in response to the changed headers, the corresponding input port numbers and a changed header write signal from the link table processing circuit e, a transmission order sorting circuit f2 for sorting a transmission order according to a changed header service priority from the sorter write control circuit f1, a header multiplexing circuit f4 for transmitting first the parallel headers in the unit of byte to transmit the cells according to the transmission order sorted by the transmission order sorting circuit f2, and a header error correction (HEC) signal generator f5 for generating a header error correction signal for the transmission headers from the header multiplexing circuit f4 and transmitting the generated header error correction signal.

An output port designation circuit f3 is provided in the ATM cell output circuit f to designate output buffers in response to input port information from the transmission order sorting circuit f2 to transmit successively the payloads of the transmission headers.

An idle cell generator f7 is also provided in the ATM cell output circuit f to transmit an idle cell upon the presence of no transmission cell.

A header transmission controller f6 is also provided in the ATM cell output circuit f to generate a control signal for controlling timing of the transmission headers and apply the generated control signal to the header multiplexing circuit f4.

As apparent from the above description, according to the present invention, the various service links are multiplexed into the single cell stream. The cells sent from the plurality of subscriber transmission lines are concentration-multiplexed into the single consecutive cell stream by the UNI. Therefore, the ATM multiplexing system of the present invention can be used commonly in the ATM network nodes, the network termination units, the terminal interface units and etc. as parts of the broadband integrated services digital network. In particular, the ATM multiplexing system of the present invention can be used commonly in the terminal adapter (B-TA) which must have a general construction to provide one subscriber with various services and a generic flow control function and in the broadband network termination unit (B-NT2) which must concentration-multiplex the cells sent from the plurality of subscriber transmission lines into the single consecutive cell stream with no distortion of the service characteristics. Also, the input stage with the almost full state frequently has the cell transmission opportunity, so that the buffer overflow and the cell conflict can be prevented. Also, according to the present invention, a faulty operation of only one node does not result in a malfunction of the whole system, and the loss of the cell synchronization resulting from the full state of the FIFO buffer can be prevented. Further, the ATM multiplexing system of the present invention is adaptive according to the service characteristics. This results in securing fairness. Moreover, the ATM multiplexing system of the present invention has no switching construction. This has the effect of avoiding the loss of a valid cell resulting from the switching connection and eliminating the waste of the channel efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An ATM multiplexing system having priority processing and header changing functions, comprising:

a plurality of ATM cell input means, each of said ATM cell input means storing a cell stream incoming from a corresponding input stage and receiving and removing instantaneous, displacement of the incoming cells;

priority encoding means for receiving simultaneously FIFO storage level information from said plurality of ATM cell input means and determining a priority for processing first an input stage with the largest number of stored cells, said FIFO storage level information including the number of the cells stored in said ATM cell input means;

link table processing means for receiving output headers from said priority encoding means and input port numbers corresponding to the received headers and outputting changed headers corresponding to the received headers;

ATM cell output means for receiving the changed headers and link information from said link table processing means, determining a cell transmission order according to a service priority and performing a header assembling function for accurate cell production;

cell transmission control means for transmitting output headers from said ATM cell output means and the corresponding payloads and controlling said ATM cell input means, said priority encoding means, said link table processing means and said ATM cell output means; and clock signal control means for generating a clock signal to control timing of said ATM cell input means, said priority encoding means, said link table processing means, said ATM cell output means and said cell transmission control means.

2. An ATM multiplexing system as set forth in claim 1, further comprising:

ATM signal/system maintenance cell input means for storing payloads of system maintenance and signal cells to perform a system maintenance function.

3. An ATM multiplexing system as set forth in claim 1, wherein each of said ATM cell input means includes:

write control means for detecting a byte clock and a cell synchronization from the cell stream incoming from the corresponding input stage, checking the presence of an error int eh cell header and generating payload data, header data, a header write signal and a payload write signal;

a header FIFO buffer for receiving the header data from said write control means through a header data bus and storing the received header data in the unit of byte in response to the header write signal from said write control means;

a payload FIFO buffer for receiving the payload data from said write control means through a payload data bus and storing the received payload data in response to the payload write signal from said write control means; and FIFO storage level indicating means for counting the number of the cells stored in said payload FIFO buffer in response to the payload write signal from said write control means and outputting the resultant FIFO storage level information.

4. An ATM multiplexing system as set forth in claim 1, wherein said priority encoding means includes:

priority determination means for controlling the first reading of the cells from the input stage with the largest number of stored cells in response to the FIFO storage level information from said ATM cell input means;

header select signal generation means for generating header select signals to read the headers from said ATM cell input means according to an order determined by said priority determination means and for generating a header input start signal, a header write clock signal and the input port number to apply the read headers to said link table processing means; and a register for controlling timing of the read headers in response to the output signals from said header select signal generation means.

5. An ATM multiplexing system as set forth in claim 1, wherein said link table processing means includes:

header inverse multiplexing means for receiving the headers from said priority encoding means through a header bus and processing the received headers in parallel;

a counter for controlling the parallel header process of said header inverse multiplexing means;

table header input control means for controlling a counting operation of said counter in response to a header input start signal and a header write clock signal from said priority encoding means;

a register array for controlling timing of the parallel headers from said header inverse multiplexing means;

link information storage means for transferring link identifier information from said register array, link identifier information changed with respect to the corresponding input port number and link service priority information to said ATM cell output means; and link table managing means for applying new link identifier information to a link table upon setting a new link or deleting the existing information upon releasing the existing link.

6. An ATM multiplexing system as set forth in claim 1, wherein said ATM cell output means includes:

sorter write control means for generating an address signal and a sorting start signal in response to the changed headers, the corresponding input port numbers and a changed header write signal from said link table processing means;

transmission order sorting means for sorting a transmission order according to a changed header service priority from said sorter write control means;

header multiplexing means for transmitting first parallel headers in the unit of byte to transmit the cells according to the transmission order sorted by said transmission order sorting means;

header error correction signal generation means for generating a header error correction signal for the transmission headers from said header multiplexing means and transmitting the generated header error correction signal;

output port designation means for designating output buffers in response to input port information from said transmission order sorting means to transmit successively the payloads of the transmission headers; and header transmission control means for generating a control signal for controlling timing of the transmission headers and applying the generated control signal to said header multiplexing means.

* * * * *